United States Patent [19]

Klein

[11] 4,197,293

[45] * Apr. 8, 1980

[54] FEED FOR POULTRY

[76] Inventor: Samuel Klein, 1814 Manor Dr., Union, N.J. 07083

[*] Notice: The portion of the term of this patent subsequent to Dec. 5, 1995, has been disclaimed.

[21] Appl. No.: 936,468

[22] Filed: Aug. 24, 1978

Related U.S. Application Data

[63] Continuation-in-part of Ser. No. 676,985, Apr. 14, 1976, abandoned, and a continuation-in-part of Ser. No. 851,917, Nov. 16, 1977, Pat. No. 4,128,640.

[51] Int. Cl.² .................... A61K 35/78; A23K 1/14; A23K 1/165
[52] U.S. Cl. ....................................... 424/195; 426/2
[58] Field of Search ........................................ 424/195

[56] References Cited

PUBLICATIONS

Poultry Science, vol. 56, No. 5, Sep. 1977, pp. 1636–1640.

*Primary Examiner*—Donald B. Moyer
*Attorney, Agent, or Firm*—Richard T. Laughlin

[57] ABSTRACT

This invention relates to an improved feed for poultry comprising vegetable materials containing a specified amount of iodine, niacin, hormones and trace amounts of calcium and magnesium which result in a lower cholesterol content of laid eggs and a process for feeding such animals.

7 Claims, No Drawings

FEED FOR POULTRY

This application is a continuation-in-part of my U.S. application Ser. No. 676,985 filed Apr. 14, 1976 now abandoned and U.S. application Ser. No. 851,917, filed Nov. 16, 1977 which issued as U.S. Pat. No. 4,128,640 on Dec. 5, 1978.

GENERAL BACKGROUND OF THE INVENTION

As is known, eggs and most commonly eggs from chickens are a source of one of the most digestible forms of protein. They further contain most of the nutritive elements necessary to sustain human life. However, the yolk of eggs contain a relatively high content of cholesterol. Cholesterol is a fat-like substance found in human bodies. It is considered a normal constituent of blood and tissues. Cholesterol is manufactured by and in the body as well as ingested. Cholesterol content of the human diet is but one of the many factors that affect the cholesterol level within the blood. Cholesterol is present only in foods of animal origin and is absent in fruits, vegetables, cereal grains, legumes, nuts and the like. The presence of high cholesterol levels in the human body is considered dangerous and specifically in promoting undesirable build up of fatty deposits in the circulatory system with the resultent long term harmful effects. Because of the nutritional value of eggs, research poultry scientists have been experimenting to attempt to have chickens lay lower cholesterol eggs. One system which has been tried is the addition of foreign deleterious chemicals to the daily rations of egg laying hens. Also, hens have been injected with synthetic hormones to produce the desired reduction in cholesterol level. This present approach was prompted by the knowledge that cholesterol levels in the blood of humans can be controlled medically with hormones, calcium and magnesium ions, high doses of niacin and other vitamins and the use of throid active substances. As would be expected, such treatments exhibit in a great many instances deleterious and adverse side effects.

Most animal feeds contain some form of natural substances. U.S. Pat. No. 3,044,877 shows the use of cellulosic materials such as alfalfa, clover, oats, barley, flax, corn cobs, rice, bran and pineapple waste for poultry feed. U.S. Pat. No. 2,849,317 shows animal feed containing legumes such as alfalfa, soybean and clover. U.S. Pat. No. 3,764,341 shows kelp as an animal feed base and U.S. Pat. No. 2,282,785 uses grasses and soybean.

GENERAL PURPOSES AND OBJECTS OF THE INVENTION

A main object of the invention is to provide a novel and improved feed for poultry and particularly such animals used for egg production for human consumption.

A further object of the invention is to provide such a feed which results in substantially reduced cholesterol content of resulting laid eggs.

A still further object is to provide a process for feeding poultry which will result in egg production of low cholesterol content.

DETAILED DESCRIPTION OF THE INVENTION

It has been discovered that a specially formulated poultry feed results in egg production having a substantially lower cholesterol content. This feed has been found to have general utilization but it is particularly effective with hens of the araucana rumpless variety. The feed comprises a special mixture of growing plant or vegetable materials and does not contain any synthetic chemicals and the like.

It has been found that poultry and specificaly chicken hens given a diet of feed which contains a specified amount of naturally occuring iodine, niacine, hormones and trace amounts of calcium and magnesium a remarkable reduction is obtained in the cholesterol content of the egg yolks in the eggs laid by such poultry. The particular vegetable matter selected for the feed supplent is not important except that the combination of species of vegetable must collectively supply the specified amount of ingredients. Also, of course, the selection must be such that a feed is produced acceptable to the poultry as a feed. The vegetable matter feed supplement in the specified amounts is added to a regular poultry (laying) feed in from 1 to 10% by weight and preferably 1.5 to 3% by weight. The combination of vegetable materials in the feed supplement must in total contain 6 to 12% by weight of iodine, 10 to 20% by weight of niacin, 1 to 5% by weight of natural hormones and fractional percentages of calcium and magnesium. Trace amounts are usually in the amount of 0.5 to 0.05% by weight. By the term natural hormones is meant a material found in vegetables which when administered to a mammal responds as a hormone i.e. as formed in one organ or part of the body and carried in the blood to another organ or part. A further definition is found on page 654, 1976 edition of STEDMAN'S MEDICAL DICTIONARY published by Williams and Wilkens, Baltimore, Maryland. By the term poultry (laying) feed is meant the normal type of mash ration given to poultry. This feed varies depending on the section of the country but is usually made up of grain products, processed grain by-products, plant protein products, animal protein products, forage products, cane molasses, vitamin suppliments, animal fat and the like.

The vegetable material utilized for the feed suppliments are preferably in the untreated dried form and pulverized to produce a mesh size of about 14 mesh. The partial size of the components of feed are well known in the art. Although dried materials are the preferred form they can also be fresh, cooked or otherwise treated. The only limitation in the method of treatment is that the resulting product must have the concentration of ingridients listed above. Typical sources of vegetable matter are the following:

Compositae such as burdock, colts foot and marigold
Cruciferae such as watercress
Caprifoliaceae such as elder flowers, viburnum, honey suckle and sambucus
Dioscoreaceae such as mexican yams
Elaegnaceae such as buffalo berry
Leguminosae such as balsam tolu, cassia, pods, fenugreek, galega, licorice, kino, sassy bark, red saunders and tamarind
Liliacae such as garlic, aletris, unicorn, and sarsaparilla
Rosaceae such as blueberries, cherries, roses, rose hips, quince seeds, raspberries and blackberries
Solanaceae such as capsicum pods and pichi leaves
Tiliaceae such as linden flowers
Gigartinaceae such as irish moss and stonewort
Urticaceae such as nettle Umbelliferae such as angelica, anise, asafoetida, caraway, coriander, celery, cumin, dill, fennel, parsley and sumbul Rhodophyceae such as species palmata (dulse)

Fucaceae such as sargasso stems

Laminaraceae such as devil's apron

Cucurma longa such as tumeric

Piperacae such as cubeba

Aristolochiaceae such as ginger

It should be understood that the various vegetable matter (botanicals) can contain one or more of the indicated components and adjustment can be made to correspond to the above percentages.

In view of the varied conditions under which the present invention may be utilized, it is not possible to set forth with the desired exactitude and certainty the proportions in which the various feed components may be employed. This will be readily appreciated when one considers that a wide combination of botanical families can be used. Also, this will be appreciated when one considers that the botanicals can be incorporated with one or more components to produce a partial feed supplement or a total feed. Then too, the poultry may be fed one feed supplement alone with the botanicals or they may be fed two feed supplements along with the botanicals. Since the identity and nature of such feed can vary, it will be understood that the composition of the invention will advantageously vary also.

In spite of the numerous factors mentioned, and others, the practical utilization of the inventive concept is easy in attainment. This is particularly true when the poultry is given a free choice. The poultry will select in a short period a certain ratio of the feeds which will best fit its needs. The proper balance is obtained by increasing the vegetable matter in the feed selected. Once the proper balance is obtained, it is a simple matter of arithmetic of calculate the proportions of the various ingredients being actually ingested. Then, if desired, the feeds can be combined into one or the feed supplement and co-feed materials may be admixed together in calculated amounts.

The cholesterol control of the yolk of eggs from various sources is reported in POULTRY SCIENCE, Vol. 56, No. 5 September 1977, pages 1636–1640. The following table is made up of data from that article:

| TYPE OF EGG | CHOLESTEROL CONTENT* | | | | |
| --- | --- | --- | --- | --- | --- |
| | Blue-D** | Blue-H** | Blue-M** | Brown*** | White**** |
| WET YOLK (g.) | 15.8 ± 1.5 | 16.4 ± 1.3 | 15.0 ± 1.7 | 16.9 ± 1.3 | 15.2 ± 1.2 |
| Mg. CHOLESTEROL/g. Yolk | 20.9 ± 1.3 | 21.8 ± 1.1 | 21.4 ± 1.7 | 20.4 ± 0.8 | 20.4 ± 1.0 |

*Extraction technique of Washburn and Nix (1974)
**Araucana
***Sex-links
****Leghorns This colorimetric method of Ziatkis, et al (1953) can also be used for determinations of cholesterol.

The following examples in which parts are by weight are given in order to illustrate the invention and not for purposes of limitation, and the feed supplements were initially made from fresh dry botanicals.

EXAMPLE I

Hens of the rumpless variety of araucana of about 8 to 10 months in age were fed the following feed:

1964 parts regular mash
36 parts of feed supplement

The feed supplement had the following composition, (unless otherwise indicated the leaves and stems of the plants were utilized and the materials are dried and pulverized to pass a 14 mesh):

| | Pounds |
| --- | --- |
| Capsicum pods (capsicum frutescens, African chillies) | 12 |
| Powdered licorice | 12 |
| Parsley | 6 |
| Elder flowers | 1 |
| Fenugreek | 1 |
| Rose hips | 1 |
| Duist | 1 |
| Devil's apron | 2 |

After utilizing the feed for three weeks with a normal average intake of 5 ounces per day, the resulting eggs were analyzed for cholesterol content and showed an average of 10.51 mg. per gram of yolk. The eggs were an average weight of about 56.7 grams. The cholesterol content of the eggs was determined by placing the yolk in a blender, mixing and making the determination at a dilution of 1:40 by Auto analyzer using a ferrouschloride color developer. All dilutions are made in isopropyl alcohol and an isopropyl alcohol blank is run between specimens to eliminate carry over. This is the same type of analysis that is used for human cholesterol. This compares with a cholesterol content of eggs laid by control hens of 15.8 mg per gram of yolk. Based on statistics of the National Commission of Egg Nutrition (Park Ridge, Illinois), the range for cholesterol content of araucana hens is 14.8 to 16.7 mg per gram of yolk. The reduction of chloresterol is over 30%.

EXAMPLE II

Araucana hens had added to their usual feed about 1.7% by weight of the following supplement:

| | Pounds |
| --- | --- |
| Capsicum pods | 10 |
| Linden flowers | 13 |
| Sarsaparilla | 7 |
| Burdock | 1 |
| Buffalo berry | 1 |
| Irish moss | 3 |

After this feed was utilized for three weeks, the eggs were analyzed for cholesterol and showed an average of 10.5 mg per gram of egg yolk with an average egg weight of 40 grams.

EXAMPLE III

Hy-Line hens No. 1 were fed a ration containing 2% by weight of the following supplement:

| | Pounds |
| --- | --- |
| Capsicum pods | 10 |

| | Pounds |
|---|---|
| Mexican yams | 13 |
| Aletris | 2 |
| Nettle | 2 |
| Unicorn root | 2 |
| Blueberries | 2 |
| Stonewart | 4 |

Hy-Line No. 1 hens lay eggs having an average cholesterol content of 18.1 mg per gram of yolk. Similar hens fed this ration showed an average of 10.72 mg per gram of yolk of cholesterol. The average weight of the eggs was 60 grams.

EXAMPLE IV

Following the procedure of Example I, the following feed supplement was used in 1.7% by weight.

| | Parts |
|---|---|
| Capsicum | 33.3 |
| Licorice | 33.4 |
| Parsley | 16.7 |
| Edler Flowers | 3.3 |
| Fenugreek | 3.3 |
| Rose hips | 3.3 |
| Sargasso stems | 6.7 |

EXAMPLE V

Following the procedure of Example II, the following feed supplement was used in 1.7% by weight to a standard feed.

| | Parts |
|---|---|
| Tumeric | 30.1 |
| Ginger | 3.3 |
| Mexican yams | 13.3 |
| Aletris | 16.7 |
| Nettle | 3.3 |
| Unicorn root | 3.3 |
| Blueberry | 3.3 |
| Stonewart | 3.4 |
| Sargasso stems | 3.3 |

Although this invention has been described with particular reference to chickens, there is no scientific basis for excluding its application to other types of fowl used as a source of eggs for human consumption such as duck or turkey. While the invention is described in detail in its preferred embodiments, it will be obvious to those skilled in the art that various changes and modifications may be made therein without departing from the spirit or scope thereof. The appended claims are intended to cover all such modifications and changes.

What is claimed is:

1. A feed supplement for chickens comprised of natural vegetable plant materials in sufficient amount to effectively decrease the cholesterol content of eggs laid by said chickens wherein said amount of supplement is from 1 to 10% by weight of the total feed and wherein said vegetable materials contain from 6 to 12% of natural occurring iodine, 10 to 20% of natural occurring niacin, 1 to 5% of natural occurring hormones and minor amounts of trace elements of calcium and magnesium.

2. The feed supplement of claim 1, wherein said feed supplement is part of a regular laying mash for araucana rumpless chickens.

3. The feed supplement of claim 1, wherein said feed supplement is 1.5 to 3% of the total feed.

4. The feed supplement of claim 1, wherein the supplement has the following composition:

| | |
|---|---|
| Capsicum pods (*solanaceae*) | 10 parts |
| Linden flowers (*tiliaceae*) | 13 |
| Sarasaparilla ((*liliacae*) | 7 |
| Burdock (*compositae*) | 1 |
| Buffalo berry (*elaegnaceae*) | 1 |
| Irish moss (*gigartinaceae*) | 3 |

5. The feed supplement of claim 4, wherein said supplement make up 1.5 to 3% of a regular mash for araucana rumpless chickens.

6. The feed supplement of claim 1, wherein the supplement has the following composition:

| | |
|---|---|
| Capsicum | 33.3 parts |
| Licorice | 33.4 |
| Parsley | 16.7 |
| Elder Flowers | 3.3 |
| Fenugreek | 3.3 |
| Rose hips | 3.3 |
| Sargasso stems | 6.7 |

7. The feed supplement of claim 1, wherein the supplement has the following composition:

| | |
|---|---|
| Tumeric | 30.1 parts |
| Ginger | 3.3 |
| Mexican yams | 13.3 |
| Aletris | 16.7 |
| Nettle | 3.3 |
| Unicorn root | 3.3 |
| Blueberry | 3.3 |
| Stonewart | 3.4 |
| Sargasso stems | 3.3 |

* * * * *